United States Patent
Chung et al.

(10) Patent No.: US 9,452,591 B2
(45) Date of Patent: Sep. 27, 2016

(54) TEMPERED GLASS SCREEN PROTECTOR APPLIED TO A PORTABLE ELECTRONIC DEVICE

(71) Applicant: G-TECH OPTOELECTRONICS CORPORATION, Miaoli County (TW)

(72) Inventors: Chih-Ming Chung, Miaoli County (TW); Hsing Chiao Lin, Miaoli County (TW); Yuh-Chang Lan, Taichung (TW)

(73) Assignee: G-TECH OPTOELECTRONICS CORPORATION, Miaoli County (TW)

( * ) Notice: Subject to any disclaimer, the term of this patent is extended or adjusted under 35 U.S.C. 154(b) by 0 days.

(21) Appl. No.: 14/665,019

(22) Filed: Mar. 23, 2015

(65) Prior Publication Data

US 2016/0107421 A1    Apr. 21, 2016

(30) Foreign Application Priority Data

Oct. 20, 2014  (TW) .............................. 103218560 U

(51) Int. Cl.
| | |
|---|---|
| *B32B 17/00* | (2006.01) |
| *B32B 3/26* | (2006.01) |
| *B32B 7/14* | (2006.01) |
| *B32B 17/06* | (2006.01) |
| *G06F 1/16* | (2006.01) |
| *H04B 1/3888* | (2015.01) |
| *H04M 1/18* | (2006.01) |
| *H04M 1/02* | (2006.01) |

(52) U.S. Cl.
CPC .............. *B32B 17/00* (2013.01); *B32B 3/266* (2013.01); *B32B 7/14* (2013.01); *B32B 17/064* (2013.01); *G06F 1/1626* (2013.01); *H04B 1/3888* (2013.01); *H04M 1/185* (2013.01); *B32B 2307/412* (2013.01); *B32B 2307/584* (2013.01); *B32B 2457/202* (2013.01); *H04M 1/0283* (2013.01); *Y10T 428/14* (2015.01)

(58) Field of Classification Search
CPC ........ B44F 1/063; G06F 1/16; G06F 1/1637; G06F 1/1626; G06F 1/1643; G06F 1/169; G06F 1/1633; G06F 3/0416; G06F 3/0412; G06F 3/044; G06F 3/041; G06F 2200/1634; G06F 2200/1633; G06F 2203/04107; G06F 2203/04103; Y10T 428/14; Y10T 428/31; Y10T 428/24331; Y10T 428/24628; Y10T 428/1471; Y10T 428/239; Y10T 428/24744; Y10T 428/24273; Y10T 428/24322; Y10T 428/24942; Y10T 428/2495; Y10T 428/24777; Y10T 428/24785; Y10T 428/24793; Y10T 428/24926; Y10T 156/1052; Y10T 156/10; Y10T 156/1057; H04B 1/3888; C09J 2201/28; C09J 7/0296; C09J 2475/006; B32B 7/12; B32B 7/045; B32B 7/06; B32B 37/12; B32B 37/18; B32B 37/0076; B32B 38/10; B32B 3/06; B32B 2457/208; B32B 2457/20; B32B 2551/00; B32B 2250/02; B32B 2571/00; H05K 5/0243; H04M 1/0283; B29C 63/0026; C03C 27/06

See application file for complete search history.

(56) References Cited

U.S. PATENT DOCUMENTS 8,044,942 B1 * 10/2011 Leonhard .............. G06F 1/1637
                                                                345/173

(Continued)

*Primary Examiner* — Patricia L Nordmeyer
(74) *Attorney, Agent, or Firm* — Li & Cai Intellectual Property (USA) Office

(57) ABSTRACT

A tempered glass screen protector includes a substrate structure, a protection structure, and an adhesion structure. The substrate structure has a transparent portion and a non-planar decorative portion extended from the transparent portion. The protection structure includes a first transparent adhesive layer disposed on the bottom surface of the transparent portion and a transparent protective layer disposed on the first transparent adhesive layer. The adhesion structure includes a first adhesive layer disposed on the bottom surface of the non-planar decorative portion, a base layer disposed on the first adhesive layer, and a second adhesive layer disposed on the base layer. The thickness of the protection structure is smaller than the thickness of the adhesion structure, so that there is no any watermark or Newton ring formed between the transparent protective layer and the display area of the portable electronic device when pressing the transparent portion.

10 Claims, 17 Drawing Sheets

(56) References Cited

U.S. PATENT DOCUMENTS

| | | | |
|---|---|---|---|
| 9,061,542 B1* | 6/2015 | Huang | B44F 1/063 |
| 9,063,699 B1* | 6/2015 | Huang | G06F 1/1643 |
| 9,292,128 B1* | 3/2016 | Huang | G06F 3/0416 |
| 2010/0221501 A1* | 9/2010 | Chen | B29C 63/0026 428/194 |
| 2010/0270189 A1* | 10/2010 | Pedersen, II | C09J 7/0296 206/320 |
| 2011/0279383 A1* | 11/2011 | Wilson | G06F 3/041 345/173 |
| 2013/0002583 A1* | 1/2013 | Jin | G06F 1/1637 345/173 |
| 2015/0323961 A1* | 11/2015 | Leonhard | G06F 1/1637 428/38 |

* cited by examiner

TEMPERED GLASS SCREEN PROTECTOR APPLIED TO A PORTABLE ELECTRONIC DEVICE

BACKGROUND OF THE INVENTION

1. Field of the Invention

The instant disclosure relates to a tempered glass screen protector, and more particularly to a tempered glass screen protector applied to a portable electronic device.

2. Description of Related Art

With the fast development of technology, electronic devise available now generally include a display screen for performing/displaying an operation state of the device. However, a liquid crystal screen is easily scratched by an external object. Thus, a screen surface is applied with a screen protector to prevent the screen from being scratched. The screen protector has been widely used in electronic devices such as mobile phones, cameras or portable multimedia players. Most of screen protectors are in a single-layer structure made from transparent plastic material. The bottom of the single layer structure includes an adhesive layer covered with a piece of release film. While applying the screen protector, peel the release film off and then attach the screen protector to the screen by the adhesive layer.

SUMMARY OF THE INVENTION

One aspect of the instant disclosure relates to a tempered glass screen protector applied to a portable electronic device.

One of the embodiments of the instant disclosure provides a tempered glass screen protector applied to a portable electronic device, comprising: a substrate structure, a protection structure, and an adhesion structure. The substrate structure has a transparent portion and two non-planar decorative portions respectively extended from two opposite sides of the transparent portion, and a bottom surface of the transparent portion and a bottom surface of each non-planar decorative portion are connected with each other. The protection structure is disposed on the bottom surface of the transparent portion, and the protection structure includes a first transparent adhesive layer disposed on the bottom surface of the transparent portion and a transparent protective layer disposed on the first transparent adhesive layer. The adhesion structure is disposed on the two bottom surfaces of the two non-planar decorative portions. The adhesion structure includes two first adhesive layers respectively disposed on the two bottom surfaces of the two non-planar decorative portions, two base layers respectively disposed on the two first adhesive layers, and two second adhesive layers respectively disposed on the two base layers.

Another one of the embodiments of the instant disclosure provides a tempered glass screen protector applied to a portable electronic device, comprising: a substrate structure, a protection structure, and an adhesion structure. The substrate structure has a transparent portion and a non-planar decorative portion extended from three sides of the transparent portion, and a bottom surface of the transparent portion and a bottom surface of the non-planar decorative portion are connected with each other. The protection structure is disposed on the bottom surface of the transparent portion, and the protection structure includes a first transparent adhesive layer disposed on the bottom surface of the transparent portion and a transparent protective layer disposed on the first transparent adhesive layer. The adhesion structure is disposed on the bottom surface of the non-planar decorative portion. The adhesion structure includes a first adhesive layer disposed on the bottom surface of the non-planar decorative portion, a base layer disposed on the first adhesive layer, and a second adhesive layer disposed on the base layer.

Yet another one of the embodiments of the instant disclosure provides a tempered glass screen protector applied to a portable electronic device, comprising: a substrate structure, a protection structure, and an adhesion structure. The substrate structure has a transparent portion and a non-planar decorative portion extended from and around an outer perimeter surface of the transparent portion, and a bottom surface of the transparent portion and a bottom surface of the non-planar decorative portion are connected with each other. The protection structure is disposed on the bottom surface of the transparent portion, and the protection structure includes a first transparent adhesive layer disposed on the bottom surface of the transparent portion and a transparent protective layer disposed on the first transparent adhesive layer. The adhesion structure is disposed on the bottom surface of the non-planar decorative portion. The adhesion structure includes a first adhesive layer disposed on the bottom surface of the non-planar decorative portion, a base layer disposed on the first adhesive layer, and a second adhesive layer disposed on the base layer.

More precisely, the thickness of the protection structure is smaller than or substantially equal to the thickness of the adhesion structure, so that the height of the protection structure from the bottommost side of the protection structure to the bottom surface of the transparent portion is smaller than or substantially equal to the height of the adhesion structure from the bottommost side of the adhesion structure to the bottom surface of the non-planar decorative portion.

To further understand the techniques, means and effects of the instant disclosure applied for achieving the prescribed objectives, the following detailed descriptions and appended drawings are hereby referred to, such that, and through which, the purposes, features and aspects of the instant disclosure can be thoroughly and concretely appreciated. However, the appended drawings are provided solely for reference and illustration, without any intention to limit the instant disclosure.

DETAILED DESCRIPTION OF THE PREFERRED EMBODIMENTS

The embodiments of "a tempered glass screen protector applied to a portable electronic device" of the instant disclosure are described. Other advantages and objectives of the instant disclosure can be easily understood by one skilled in the art from the disclosure. The instant disclosure can be applied in different embodiments. Various modifications and variations can be made to various details in the description for different applications without departing from the scope of the instant disclosure. The drawings of the instant disclosure are provided only for simple illustrations, but are not drawn to scale and do not reflect the actual relative dimensions. The following embodiments are provided to describe in detail the concept of the instant disclosure, and are not intended to limit the scope thereof in any way.

[First Embodiment]

Figure 1:
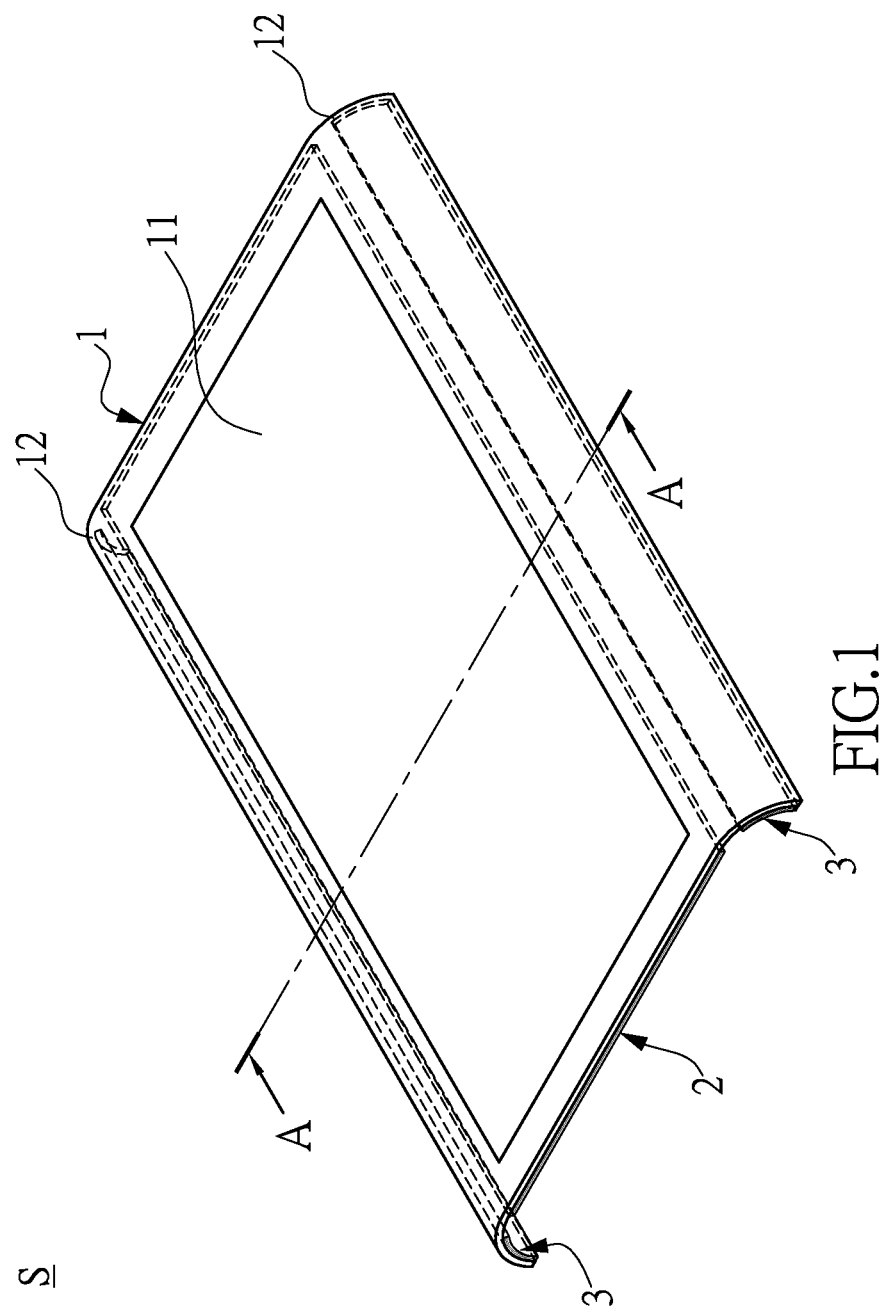
FIG. 1 shows a perspective, schematic view of a tempered glass screen protector according to the first embodiment of the instant disclosure.
Figure 4:
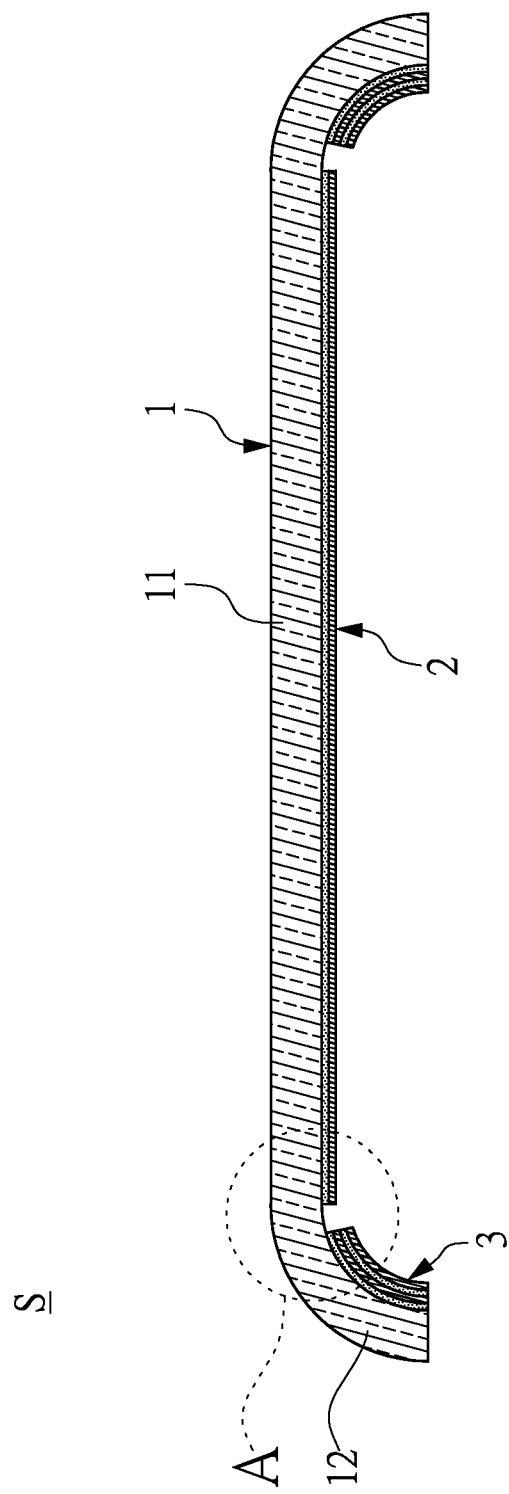
FIG. 4 shows a cross-sectional view taken along the section line A-A of FIG. 1, the section line B-B of FIG. 2, or the section line C-C of FIG. 3.
Figure 5:
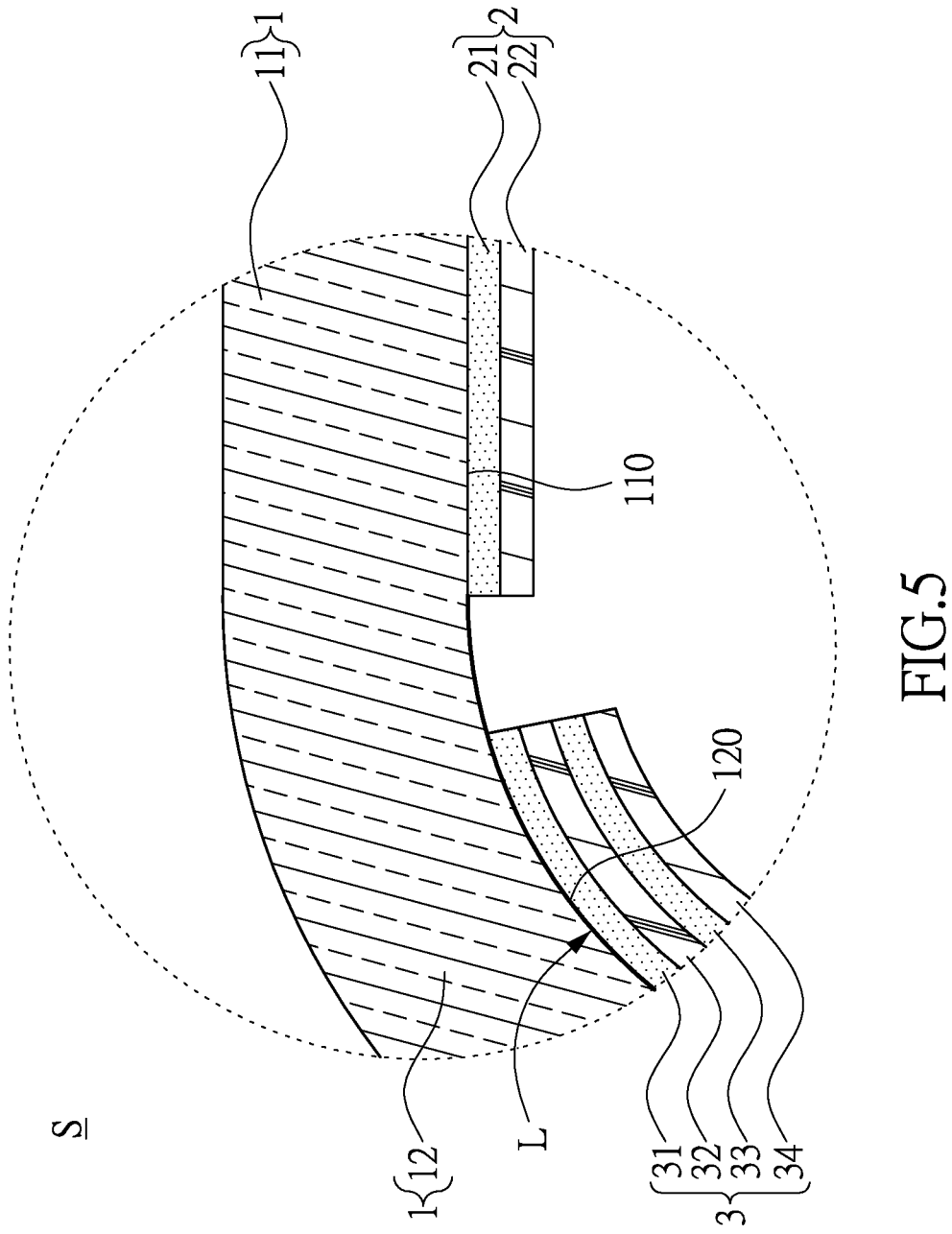
FIG. 5 shows an enlarged, schematic view taken on part A of FIG. 4.
Figure 6:
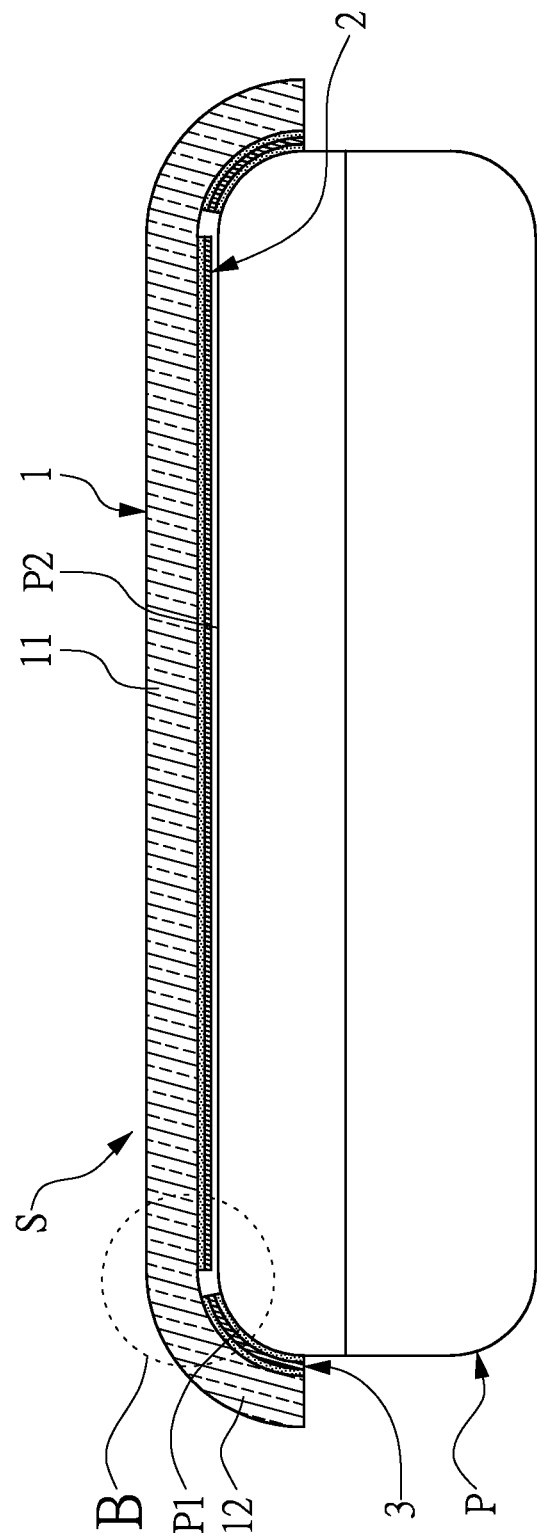
FIG. 6 shows a cross-sectional, schematic view of the tempered glass screen protector of FIG. 4 applied to a portable electronic device according to the instant disclosure.
Figure 7:
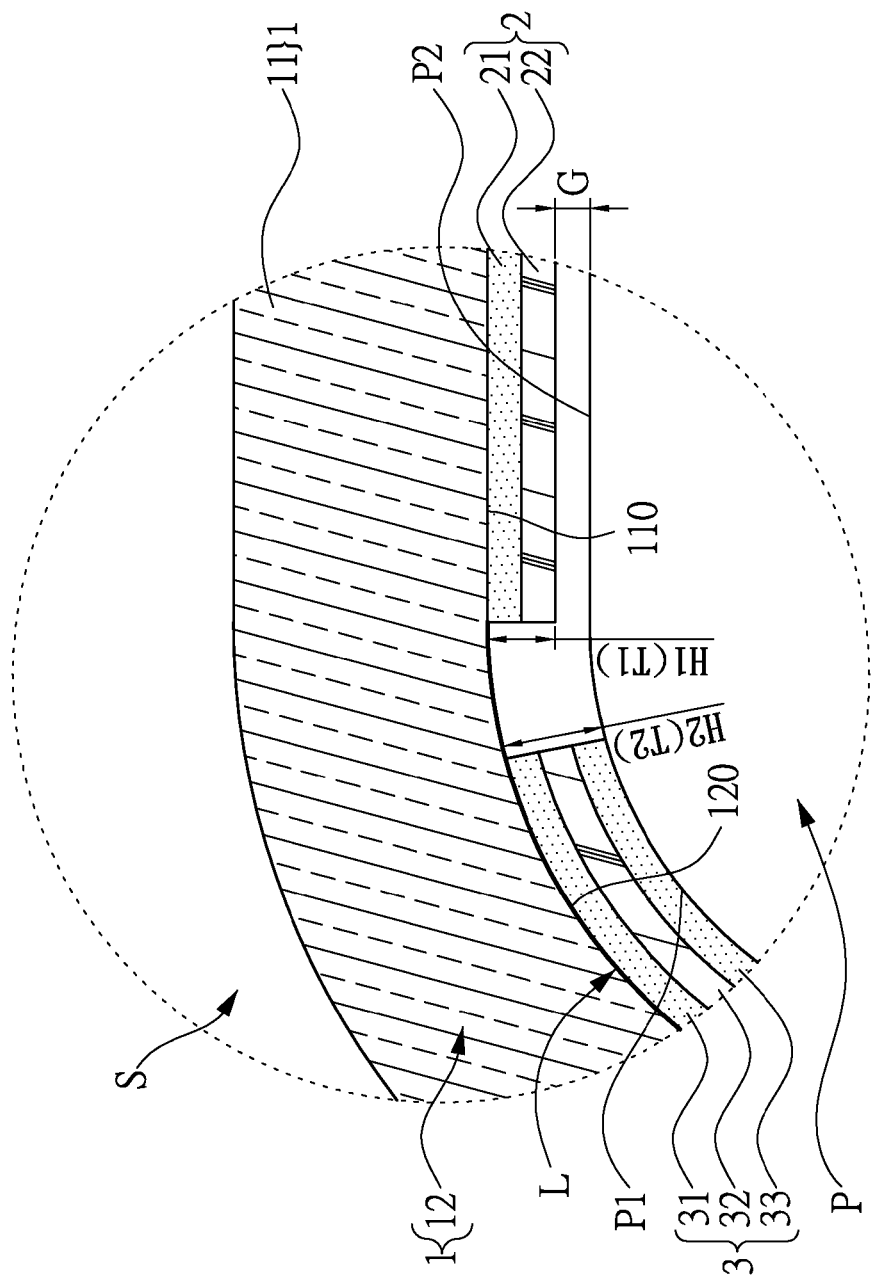
FIG. 7 shows an enlarged, schematic view taken on part B of FIG. 6.

Referring to FIG. 1, and FIG. 4 to FIG. 7, where FIG. 4 shows a cross-sectional view taken along the section line A-A of FIG. 1, FIG. 5 shows an enlarged, schematic view taken on part A of FIG. 4, FIG. 6 shows a cross-sectional, schematic view of the tempered glass screen protector of FIG. 4 applied to a portable electronic device, and FIG. 7 shows an enlarged, schematic view taken on part B of FIG. 6. The first embodiment of the instant disclosure provides a tempered glass screen protector S applied to a portable electronic device P (such as a tempered glass screen protective paster or sticker is attached to a mobile phone), comprising: a substrate structure 1, a protection structure 2, and an adhesion structure 3.

First, referring to FIG. 1, FIG. 4, and FIG. 5, the substrate structure 1 has a transparent portion 11 and two non-planar decorative portions 12 respectively extended from two opposite sides of the transparent portion 11, and a bottom surface 110 of the transparent portion 11 and a bottom surface 120 of each non-planar decorative portion 12 are connected with each other. For example, the substrate structure 1 may be a non-planar tempered glass having a transparent bottom area (i.e., the bottom surface 110 of the transparent portion 11) and a nontransparent bottom area (i.e., the bottom surface 120 of each non-planar decorative portion 12), and the thickness of the substrate structure 1 is substantially between 0.2, mm and 0.55, mm. In addition, the transparent portion 11 can be formed as a 3D appearance having a plane surface, a curved surface, an arc surface, or an irregular surface, and the non-planar decorative portion 12 also can be formed as a 3D appearance having a plane surface, a curved surface, an arc surface, or an irregular surface. The substrate structure 1 further includes a color coating layer L (such as a black layer, a white layer, a red layer, a gray layer, or a blue layer etc.) coated on the bottom surface 120 of each non-planar decorative portion 12, or the substrate structure 1 further includes a surface texture microstructure formed on the bottom surface 120 of each non-planar decorative portion 12. However, the above-mentioned design for the substrate structure 1 is merely an example and is not meant to limit the instant disclosure.

Moreover, referring to FIG. 1, FIG. 4, and FIG. 5, the protection structure 2 disposed on the bottom surface 110 of the transparent portion 11, and the protection structure 2 includes a first transparent adhesive layer 21 disposed on the bottom surface 110 of the transparent portion 11 and a transparent protective layer 22 disposed on the first transparent adhesive layer 21. For example, the first transparent adhesive layer 21 may be a high transmittance adhesive agent that is made of one of an acrylate material, an epoxy resin material, and a silicon resin material, and the transparent protective layer 22 may be an anti-watermark transparent film or an anti-Newton ring transparent film that has a thickness smaller than or substantially equal to 150 μm and a haze substantially between 0.1% and 2%, but this is merely an example and is not meant to limit the instant disclosure.

Furthermore, referring to FIG. 1, FIG. 4, and FIG. 5, the adhesion structure 3 disposed on the two bottom surfaces 120 of the two non-planar decorative portions 12. The adhesion structure 3 includes two first adhesive layers 31 respectively disposed on the two bottom surfaces 120 of the two non-planar decorative portions 12, two base layers 32 respectively disposed on the two first adhesive layers 31, and two second adhesive layers 33 respectively disposed on the two base layers 32, for example, the first adhesive layer 31, the base layer 32, and the second adhesive layer 33 can be made of transparent or opaque material. In addition, the adhesion structure 3 further includes two second release films 34 respectively disposed on the two second adhesive layers 33. For example, the base layer 32 may be a base substrate made of one of poly ethylene terephthalate (PET), polymethylmethacrylate (PMMA), and polycarbonate (PC). The first adhesive layer 31 may be a water-proof explosion-proof adhesive agent made of one of an acrylate material, an epoxy resin material, and a silicon resin material, and the second adhesive layer 33 may be a water-proof explosion-proof adhesive agent made of one of an acrylate material, an epoxy resin material, and a silicon resin material. However, the above-mentioned design for the adhesion structure 3 is merely an example and is not meant to limit the instant disclosure. It is worth mentioning that, referring to FIG. 5, the protection structure 2 and the adhesion structure 3 are separated from each other to form a gap (not labeled) between the protection structure 2 and the adhesion structure 3.

In addition, referring to FIG. 1, FIG. 4, FIG. 6 and FIG. 7, after the two second release films 34 are respectively peeled off from the two second adhesive layers 33, the tempered glass screen protector S can be adhesively placed on the portable electronic device P through the two second adhesive layers 33, so that the second adhesive layer 33 is connected between the base layer 32 and a decoration area P1 of the portable electronic device P, and a gap G is formed between the transparent protective layer 22 and a display area P2 (in which the display area P2 is surrounded by the decoration area P1) of the portable electronic device P for separating the transparent protective layer 22 and the display area P2 of the portable electronic device P from each other. More precisely, the transparent protective layer 22 of the protection structure 2 cannot touch the display area P2 of the portable electronic device P, so that there is no any watermark or Newton ring formed between the transparent protective layer 22 of the protection structure 2 and the display area P2 of the portable electronic device P when pressing the transparent portion 11 of the substrate structure 1.

Therefore, in the this embodiment, the thickness H1 of the protection structure 2 is smaller than the thickness H2 of the adhesion structure 3 (for example, the difference in thickness between the protection structure 2 and the adhesion structure 3 is substantially between 0, and 0.15, mm), so that the height T1 of the protection structure 2 from the bottommost side of the protection structure 2 to the bottom surface 110 of the transparent portion 11 is smaller than the height T2 of the adhesion structure 3 from the bottommost side of the adhesion structure 3 to the bottom surface 120 of the non-planar decorative portion 12. Hence, there is no any watermark or Newton ring formed between the transparent protective layer 22 of the protection structure 2 and the display area P2 of the portable electronic device P when pressing the transparent portion 11 of the substrate structure 1.

In conclusion, the tempered glass screen protector S of the first embodiment has a gap G formed between the transparent protective layer 22 and a display area P2 of the portable electronic device P due to the design of "the thickness H1 of the protection structure 2 being smaller than the thickness H2 of the adhesion structure 3" or "the height T1 of the protection structure 2 from the bottommost side of the protection structure 2 to the bottom surface 110 of the transparent portion 11 being smaller than the height T2 of the adhesion structure 3 from the bottommost side of the adhesion structure 3 to the bottom surface 120 of the non-planar decorative portion 12", so that there is no any watermark or Newton ring formed between the transparent protective layer 22 of the protection structure 2 and the display area P2 of the portable electronic device P due to the design of the gap G when a user presses the transparent portion 11 of the substrate structure 1.

[Second Embodiment]

Figure 2:
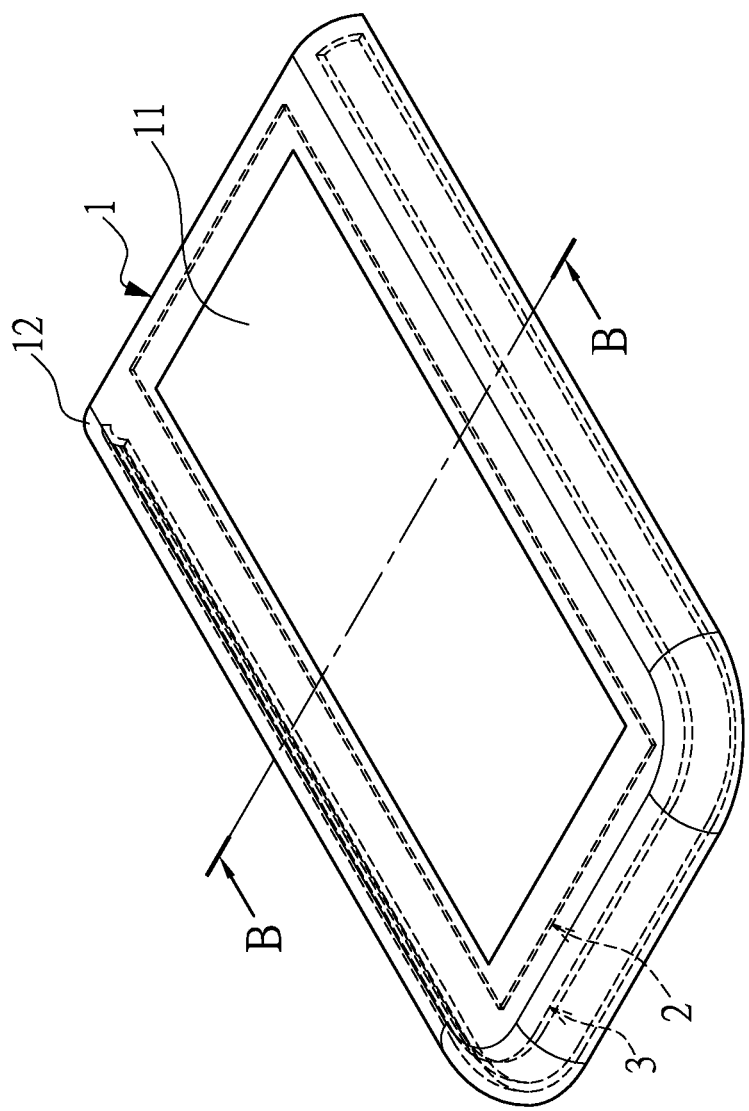
FIG. 2 shows a perspective, schematic view of a tempered glass screen protector according to the second embodiment of the instant disclosure.

Referring to FIG. 2, and FIG. 4 to FIG. 7, where FIG. 4 shows a cross-sectional view taken along the section line B-B of FIG. 2. The second embodiment of the instant disclosure provides a tempered glass screen protector S applied to a portable electronic device P, comprising: a substrate structure 1, a protection structure 2, and an adhesion structure 3.

First, referring to FIG. 2, FIG. 4, and FIG. 5, the substrate structure 1 has a transparent portion 11 and a non-planar decorative portion 12 extended from three sides of the transparent portion 11, and a bottom surface 110 of the transparent portion 11 and a bottom surface 120 of the non-planar decorative portion 12 are connected with each other. In addition, the protection structure 2 is disposed on the bottom surface 110 of the transparent portion 11, and the protection structure 2 includes a first transparent adhesive layer 21 disposed on the bottom surface 110 of the transparent portion 11 and a transparent protective layer 22 disposed on the first transparent adhesive layer 21. Moreover, the adhesion structure 3 is disposed on the bottom surface 120 of the non-planar decorative portion 12, and the adhesion structure 3 includes a first adhesive layer 31 disposed on the bottom surface 120 of the non-planar decorative portion 12, a base layer 32 disposed on the first adhesive layer 31, a second adhesive layer 33 disposed on the base layer 32, and a second release film 34 disposed on the second adhesive layer 33.

Furthermore, referring to FIG. 2, FIG. 4, FIG. 6, and FIG. 7, after the second release film 34 is peeled off from the second adhesive layer 33, the tempered glass screen protector S can be adhesively placed on the portable electronic device P through the second adhesive layer 33. In the this embodiment, the thickness H1 of the protection structure 2 is smaller than the thickness H2 of the adhesion structure 3 (for example, the difference in thickness between the protection structure 2 and the adhesion structure 3 is substantially between 0, and 0.15, mm), so that the height T1 of the protection structure 2 from the bottommost side of the protection structure 2 to the bottom surface 110 of the transparent portion 11 is smaller than the height T2 of the adhesion structure 3 from the bottommost side of the adhesion structure 3 to the bottom surface 120 of the non-planar decorative portion 12, and then there is a gap G formed between the transparent protective layer 22 and a display area P2 of the portable electronic device P for separating the transparent protective layer 22 and the display area P2 of the portable electronic device P from each other. Hence, there is no any watermark or Newton ring formed between the transparent protective layer 22 of the protection structure 2 and the display area P2 of the portable electronic device P due to the design of the gap G when a user presses the transparent portion 11 of the substrate structure 1.

[Third Embodiment]

Figure 3:
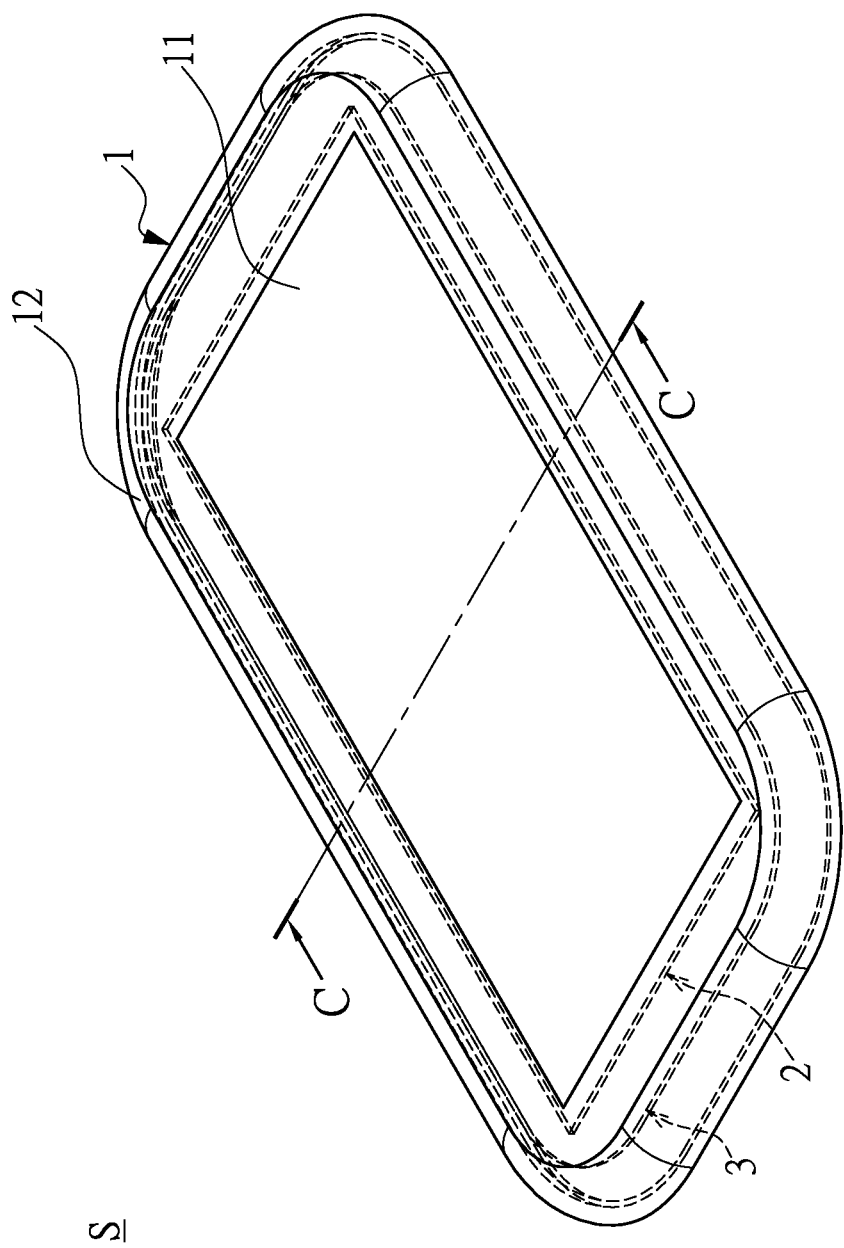
FIG. 3 shows a perspective, schematic view of a tempered glass screen protector according to the third embodiment of the instant disclosure.

Referring to FIG. 3, and FIG. 4 to FIG. 7, where FIG. 4 shows a cross-sectional view taken along the section line C-C of FIG. 3. The third embodiment of the instant disclosure provides a tempered glass screen protector S applied to a portable electronic device P, comprising: a substrate structure 1, a protection structure 2, and an adhesion structure 3.

First, referring to FIG. 3, FIG. 4, and FIG. 5, the substrate structure 1 has a transparent portion 11 and a non-planar decorative portion 12 extended from an outer perimeter surface (such as an outer periphery surface) of the transparent portion 11 to surround the transparent portion 11, and a bottom surface 110 of the transparent portion 11 and a bottom surface 120 of the non-planar decorative portion 12 are connected with each other. In addition, the protection structure 2 is disposed on the bottom surface 110 of the transparent portion 11, and the protection structure 2 includes a first transparent adhesive layer 21 disposed on the bottom surface 110 of the transparent portion 11 and a transparent protective layer 22 disposed on the first transparent adhesive layer 21. Moreover, the adhesion structure 3 is disposed on the bottom surface 120 of the non-planar decorative portion 12, and the adhesion structure 3 includes a first adhesive layer 31 disposed on the bottom surface 120 of the non-planar decorative portion 12, a base layer 32 disposed on the first adhesive layer 31, a second adhesive layer 33 disposed on the base layer 32, and a second release film 34 disposed on the second adhesive layer 33.

Furthermore, referring to FIG. 3, FIG. 4, FIG. 6, and FIG. 7, after the second release film 34 is peeled off from the second adhesive layer 33, the tempered glass screen protector S can be adhesively placed on the portable electronic device P through the second adhesive layer 33. In the this embodiment, the thickness H1 of the protection structure 2 is smaller than the thickness H2 of the adhesion structure 3 (for example, the difference in thickness between the protection structure 2 and the adhesion structure 3 is substantially between 0, and 0.15, mm), so that the height T1 of the protection structure 2 from the bottommost side of the protection structure 2 to the bottom surface 110 of the transparent portion 11 is smaller than the height T2 of the adhesion structure 3 from the bottommost side of the adhesion structure 3 to the bottom surface 120 of the non-planar decorative portion 12, and then there is a gap G formed between the transparent protective layer 22 and a display area P2 of the portable electronic device P for separating the transparent protective layer 22 and the display area P2 of the portable electronic device P from each other. Hence, there is no any watermark or Newton ring formed between the transparent protective layer 22 of the protection structure 2 and the display area P2 of the portable electronic device P due to the design of the gap G when a user presses the transparent portion 11 of the substrate structure 1.

[Fourth Embodiment]

Figure 8:
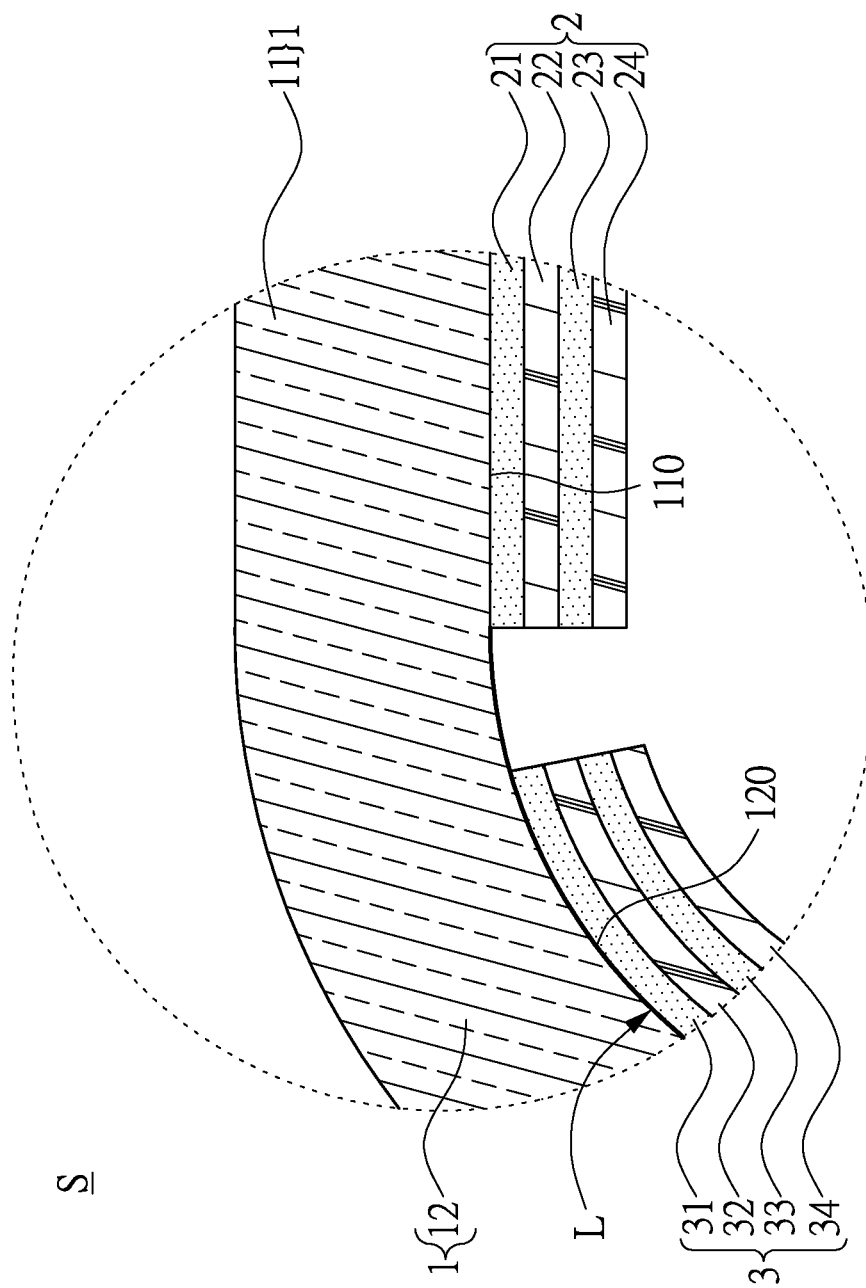
FIG. 8 shows a cross-sectional, schematic view of a tempered glass screen protector according to the fourth embodiment of the instant disclosure.
Figure 9:
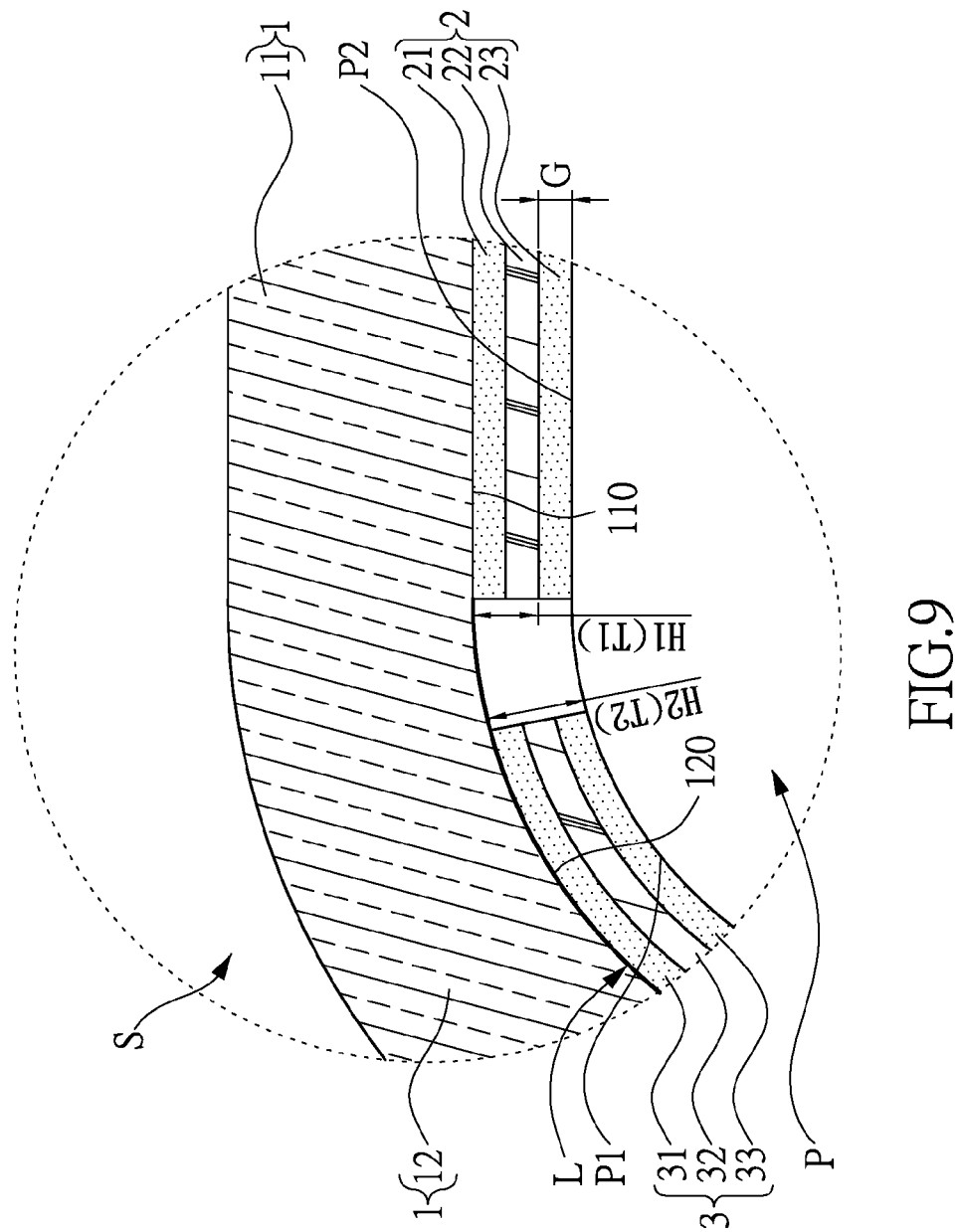
FIG. 9 shows a cross-sectional, schematic view of the tempered glass screen protector of FIG. 8 applied to a portable electronic device according to the instant disclosure.

Referring to FIG. 8 and FIG. 9, the fourth embodiment of the instant disclosure provides a tempered glass screen protector S applied to a portable electronic device P, comprising: a substrate structure 1, a protection structure 2, and an adhesion structure 3. As shown in FIG. 8, the protection structure 1 includes a second transparent adhesive layer 23 disposed on the transparent protective layer 22 and a first release film 24 disposed on the second transparent adhesive layer 23. Therefore, as shown in FIG. 9, after the first release film 24 is peeled off from the second transparent adhesive layer 23, the protection structure 2 can be adhesively placed on the display area P2 of the portable electronic device P through the second transparent adhesive layer 23. Hence, the second transparent adhesive layer 23 is connected between the transparent protective layer 22 and the display area P2 of the portable electronic device P.

[Fifth Embodiment]

Figure 10:
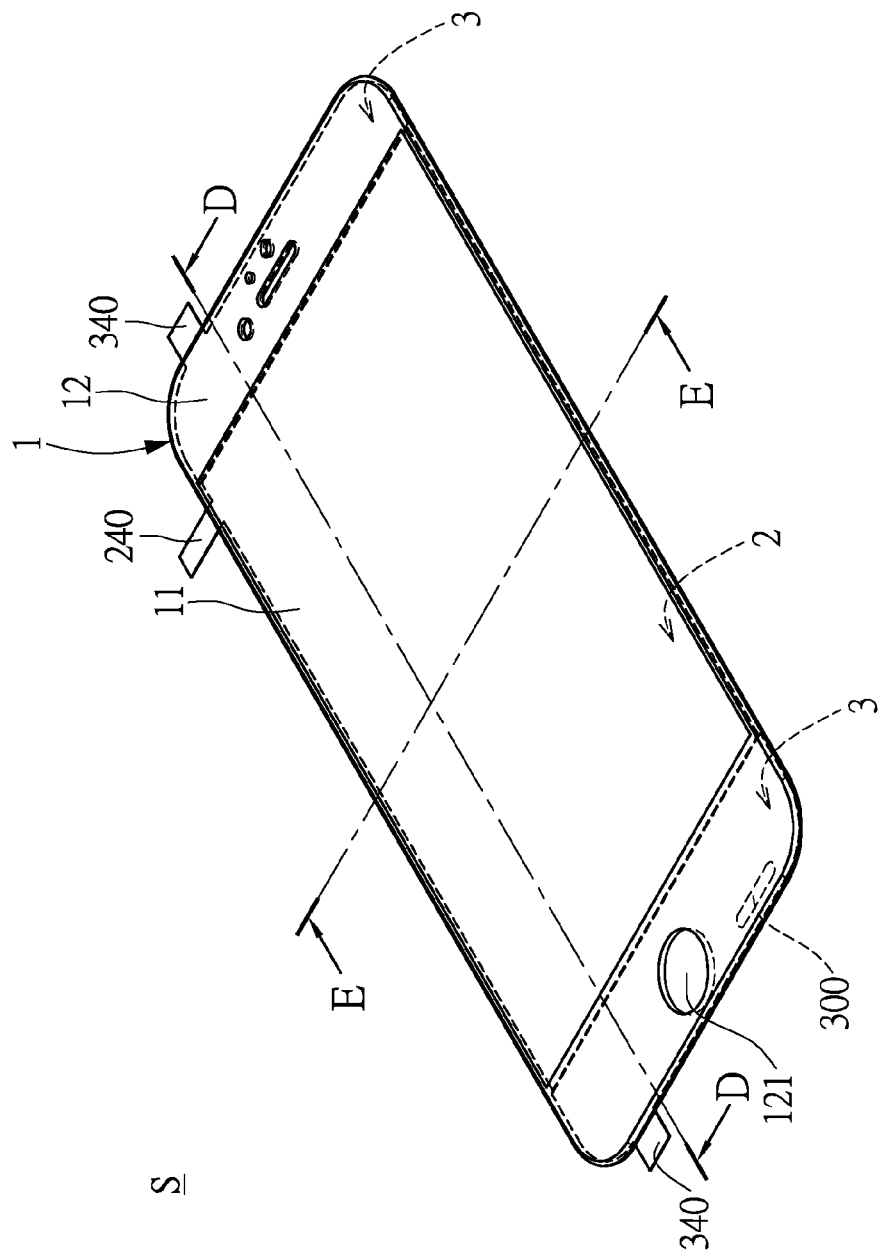
FIG. 10 shows a perspective, schematic view of a tempered glass screen protector according to the fifth embodiment of the instant disclosure.
Figure 11:
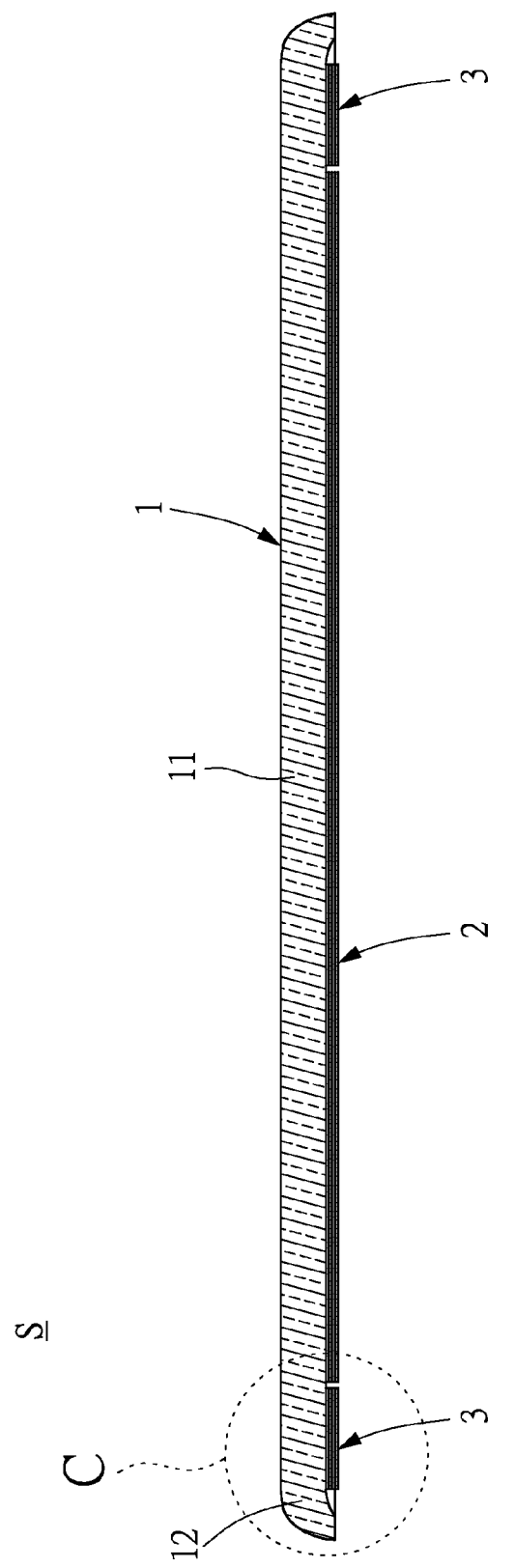
FIG. 11 shows a cross-sectional view taken along the section line D-D of FIG. 10.
Figure 12:
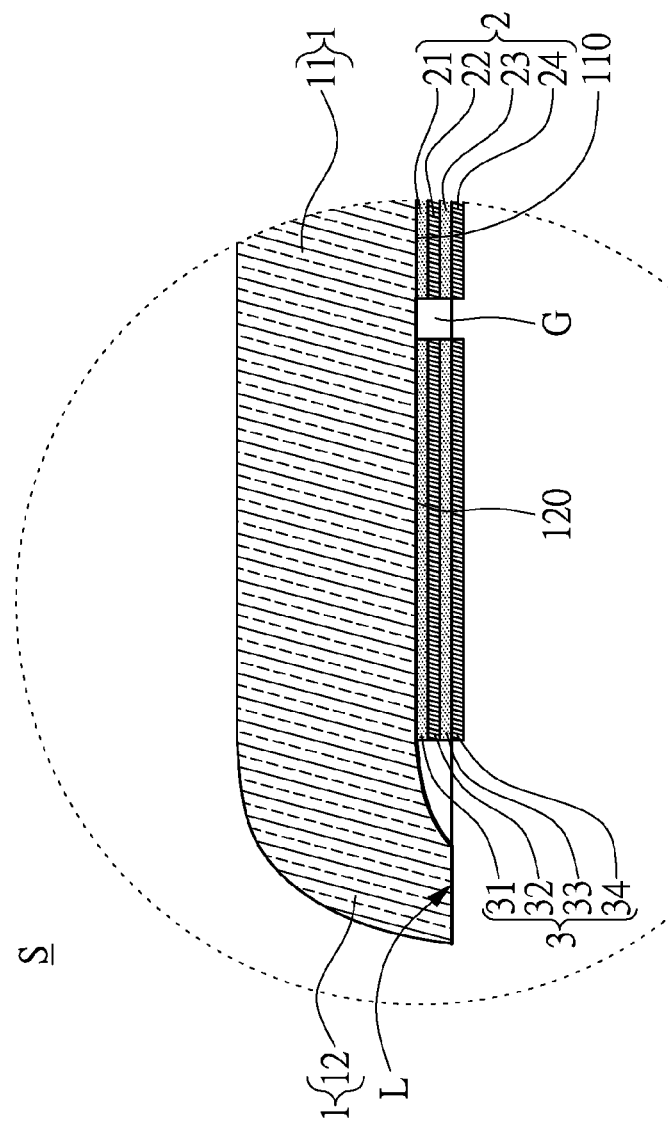
FIG. 12 shows an enlarged, schematic view taken on part C of FIG. 11.
Figure 13:
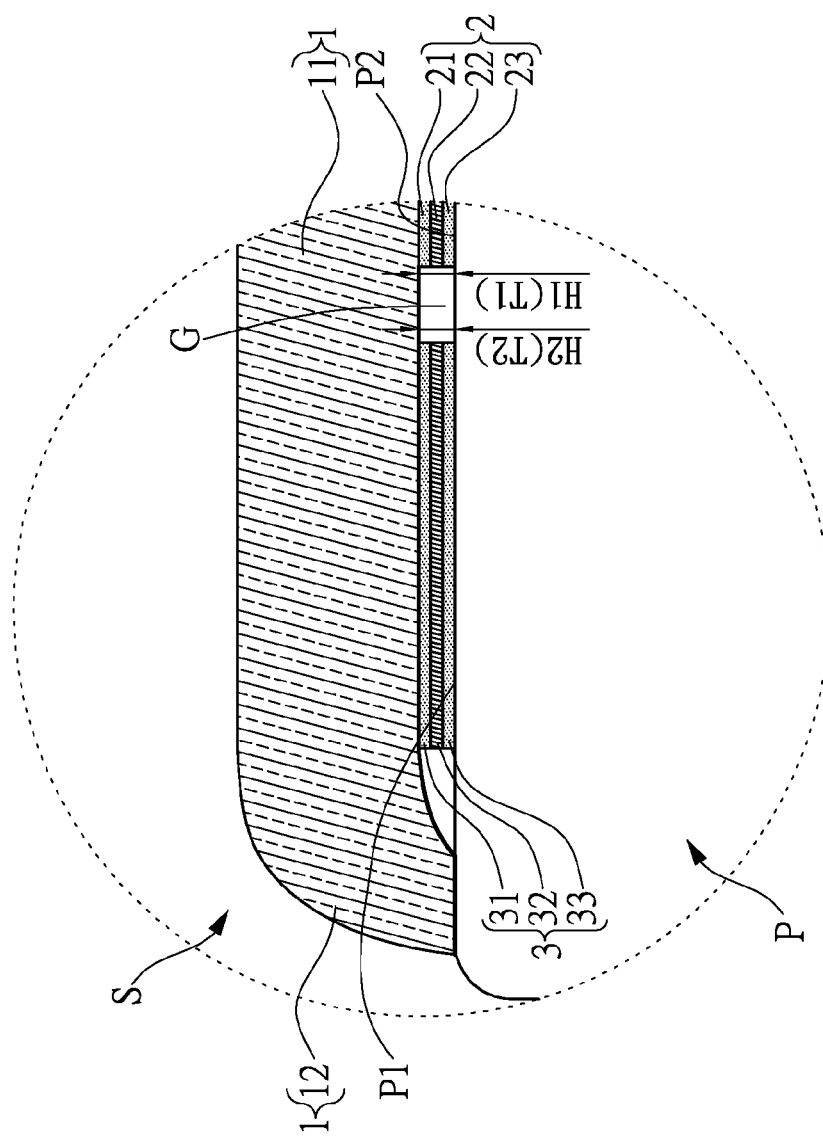
FIG. 13 shows a cross-sectional, schematic view of the tempered glass screen protector of FIG. 12 applied to a portable electronic device according to the instant disclosure.
Figure 14:
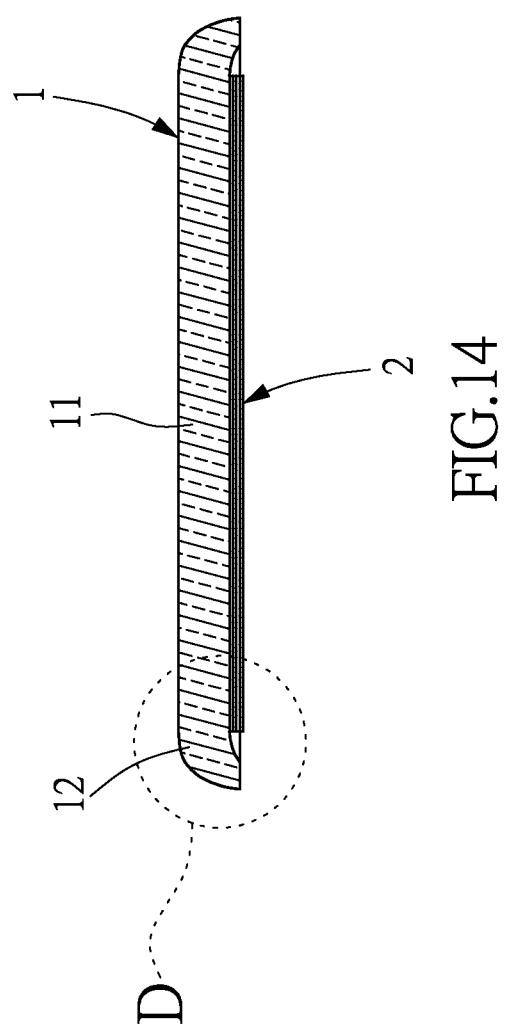
FIG. 14 shows a cross-sectional view taken along the section line E-E of FIG. 10.
Figure 15:
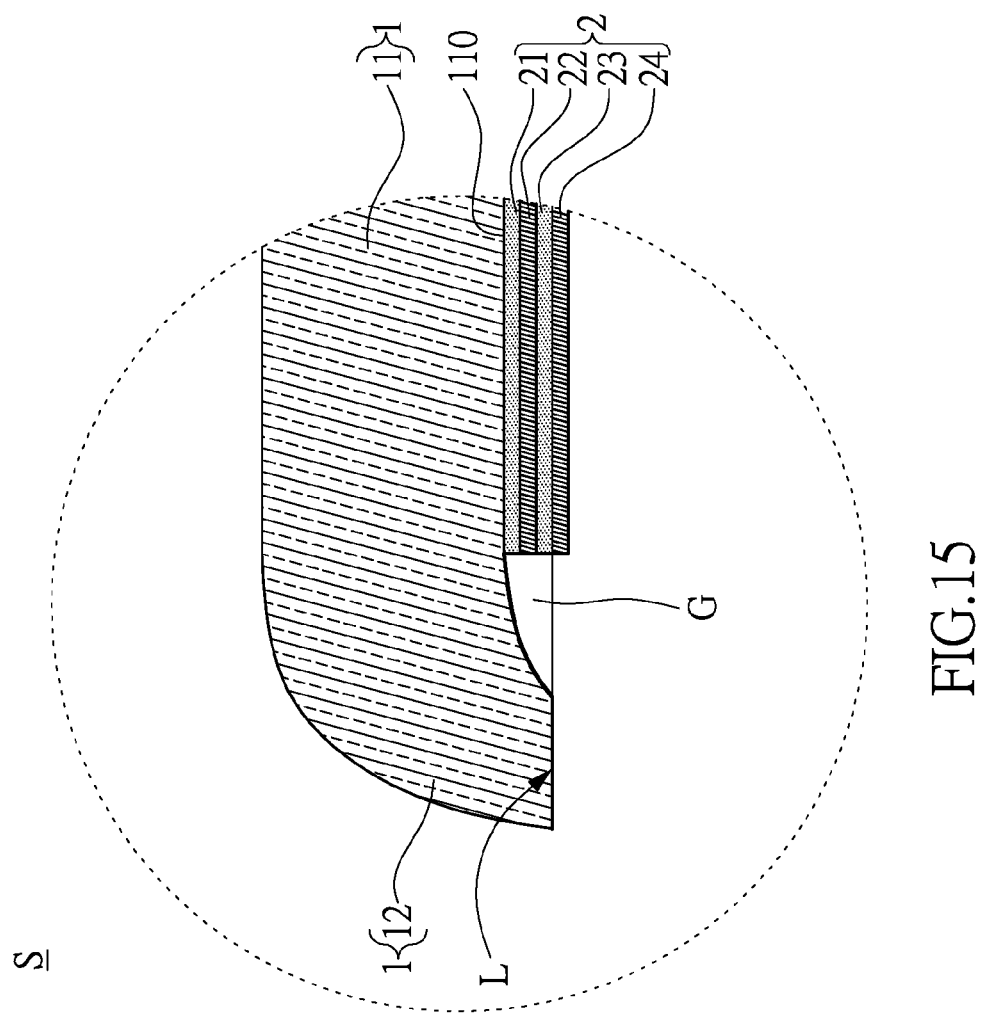
FIG. 15 shows an enlarged, schematic view taken on part D of FIG. 14.
Figure 16:
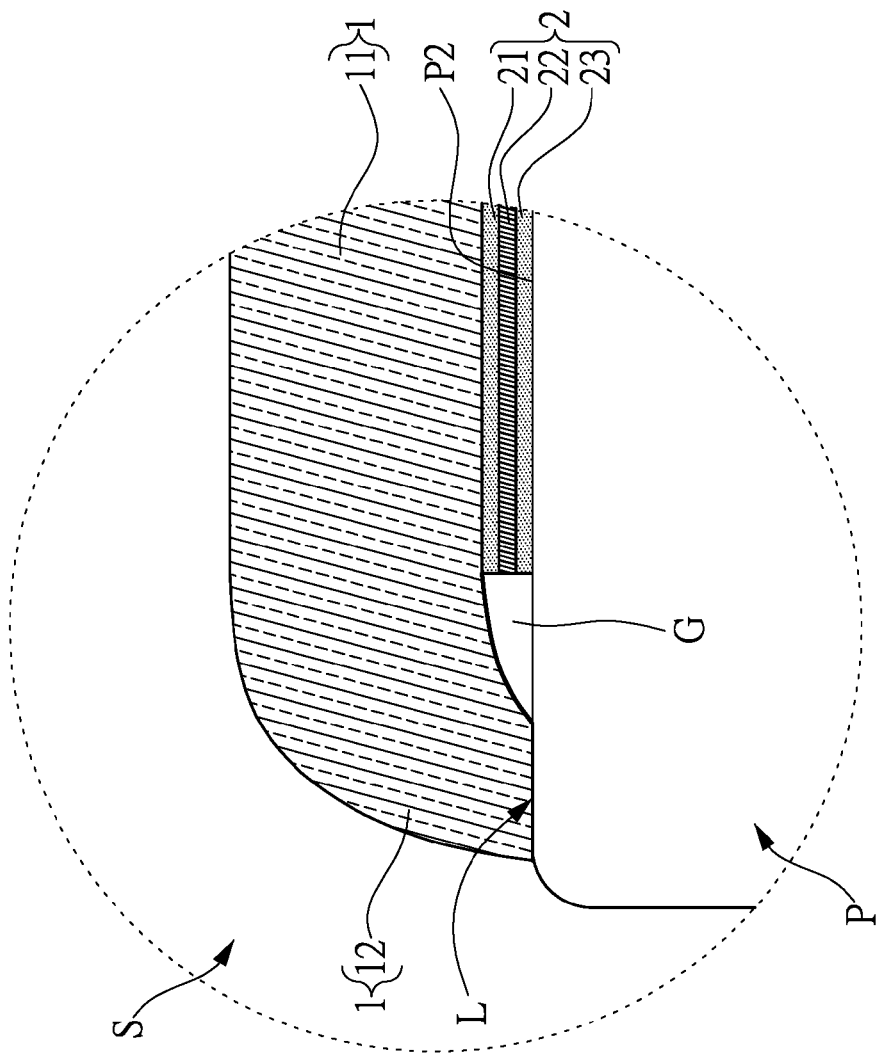
FIG. 16 shows a cross-sectional, schematic view of the tempered glass screen protector of FIG. 15 applied to a portable electronic device according to the instant disclosure.

Referring to FIG. 10 to FIG. 17, where FIG. 11 shows a cross-sectional view taken along the section line D-D of FIG. 10, FIG. 12 shows an enlarged, schematic view taken on part C of FIG. 11, FIG. 13 shows a cross-sectional, schematic view of the tempered glass screen protector of FIG. 12 applied to a portable electronic device according to the instant disclosure, FIG. 14 shows a cross-sectional view taken along the section line E-E of FIG. 10, FIG. 15 shows an enlarged, schematic view taken on part D of FIG. 14, and FIG. 16 shows a cross-sectional, schematic view of the tempered glass screen protector of FIG. 15 applied to a portable electronic device according to the instant disclosure. The fifth embodiment of the instant disclosure provides a tempered glass screen protector S applied to a portable electronic device P, comprising: a substrate structure 1, a protection structure 2, and an adhesion structure 3, and the substrate structure 1 as a 3D structure has a transparent portion 11 and a non-planar decorative portion 12 extended from an outer perimeter surface of the transparent portion 11 to surround the transparent portion 11.

First, referring to FIG. 10 to FIG. 13, the protection structure 2 includes a first transparent adhesive layer 21 disposed on the bottom surface 110 of the transparent portion 11, a transparent protective layer 22 disposed on the first transparent adhesive layer 21, a second transparent adhesive layer 23 disposed on the transparent protective layer 22, and a first release film 24 disposed on the second transparent adhesive layer 23. More precisely, the first release film 24 has a first manual peeling portion 240 separated from the second transparent adhesive layer 23. Therefore, referring to FIG. 10 and FIG. 13, after the first release film 24 is peeled off from the second transparent adhesive layer 23 through the first manual peeling portion 240, the protection structure 2 can be adhesively placed on the display area P2 of the portable electronic device P through the second transparent adhesive layer 23. Hence, the second transparent adhesive layer 23 is connected between the transparent protective layer 22 and the display area P2 of the portable electronic device P.

In addition, referring to FIG. 10 to FIG. 13, the adhesion structure 3 includes two first adhesive layers 31 respectively disposed on the two bottom surfaces 120 of the two non-planar decorative portions 12, two base layers 32 respectively disposed on the two first adhesive layers 31, two second adhesive layers 33 respectively disposed on the two base layers 32, and two second release films 34 respectively disposed on the two second adhesive layers 33. More precisely, each second release film 34 has a second manual peeling portion 340 separated from the corresponding second adhesive layer 33.

Therefore, referring to FIG. 10 and FIG. 13, after the second release film 34 is peeled off from the second adhesive layer 33 through the second manual peeling portion 340, the adhesion structure 3 can be adhesively placed on the decoration area P1 of the portable electronic device P through the second adhesive layer 33. Hence, the second adhesive layer 33 is connected between the base layer 32 and the decoration area P1 of the portable electronic device P.

Figure 17:
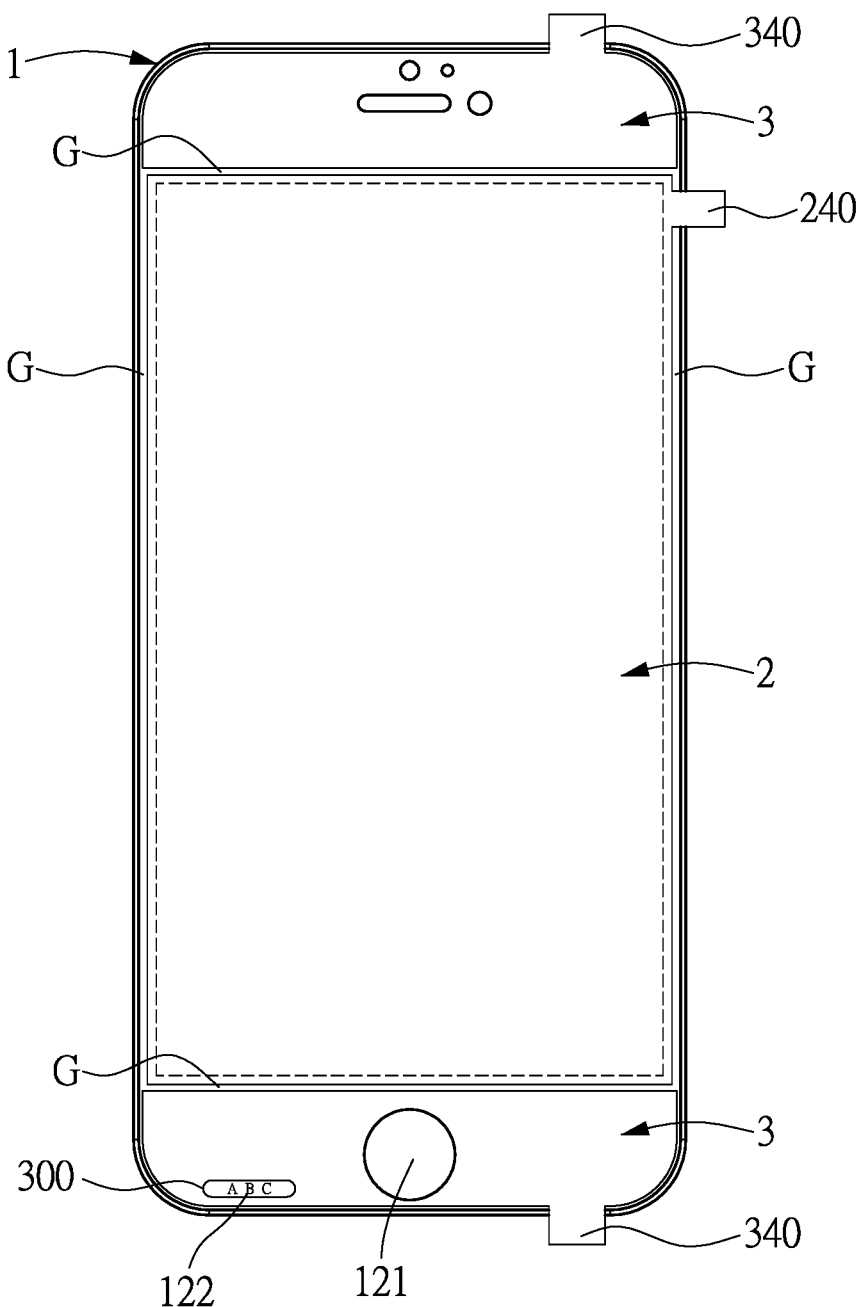
FIG. 17 shows a bottom, schematic view of a tempered glass screen protector according to the fifth embodiment of the instant disclosure.

More precisely, referring to FIG. 10 and FIG. 17, the non-planar decorative portion 12 has a positioning through hole 121 corresponding to an alignment mark of the portable electronic device P, and the alignment mark may be a key body, a speaker hole, or an image-capturing hole etc. In addition, as shown in FIG. 17, the adhesion structure 3 has a passing opening 300 for exposing a predetermined pattern 122 (such as ABC shown in FIG. 7 or any logo) on the bottom surface 120 of the non-planar decorative portion 12.

It is worth mentioning that in the fourth and the fifth embodiments, the transparent protective layer 22 may be an anti-watermark transparent film that has a thickness smaller than or substantially equal to 150 μm, a transmittance substantially between 88% and 99%, and a haze substantially between 0.1% and 2%. The first transparent adhesive layer 21 may be a high transmittance adhesive agent that has a adhesive force substantially between 8, N/25, mm and 50, N/25, mm and is made of one of an acrylate material, an epoxy resin material, and a silicon resin material, and the second transparent adhesive layer 23 may be a high transmittance adhesive agent that has a adhesive force substantially between 10, N/25, mm and 200 N/25, mm and is made of a silicon resin material. In addition, the thickness H1 of the protection structure 2 is smaller than or substantially equal to the thickness H2 of the adhesion structure 3 (for example, the difference in thickness between the protection structure 2 and the adhesion structure 3 is substantially between 0, and 0.15, mm), so that the height T1 of the protection structure 2 from the bottommost side of the protection structure 2 to the bottom surface 110 of the transparent portion 11 is smaller than or substantially equal to the height T2 of the adhesion structure 3 from the bottommost side of the adhesion structure 3 to the bottom surface 120 of the non-planar decorative portion 12.

It is worth noting that referring to FIG. 12 and FIG. 13, the protection structure 2 and the adhesion structure 3 are separated from each other to form an air-discharging passage g between the protection structure 2 and the adhesion structure 3. Therefore, when the second transparent adhesive layer 23 of the protection structure 2 is attached to the display area P2 of the portable electronic device P, it is convenient for a user to discharge air between the second transparent adhesive layer 23 of the protection structure 2 and the display area P2 of the portable electronic device P through the air-discharging passage g. In addition, referring to FIG. 15, FIG. 16, and FIG. 17, the protection structure 2 has another two air-discharging passages g respectively formed on two opposite long sides thereof for discharging air generated between the second transparent adhesive layer 23 of the protection structure 2 and the display area P2 of the portable electronic device P. Hence, there is no any watermark or Newton ring formed between the second transparent adhesive layer 23 of the protection structure 2 and the display area P2 of the portable electronic device P due to the design of the air-discharging passages g when a user presses the transparent portion 11 of the substrate structure 1.

The aforementioned descriptions merely represent the preferred embodiments of the instant disclosure, without any intention to limit the scope of the instant disclosure which is fully described only within the following claims. Various equivalent changes, alterations or modifications based on the claims of the instant disclosure are all, consequently, viewed as being embraced by the scope of the instant disclosure.

What is claimed is:

1. A glass protector applied to a portable electronic device, comprising:
   a substrate structure having a transparent portion and two non-planar decorative portions respectively extended from two opposite sides of the transparent portion, wherein a bottom surface of the transparent portion and a bottom surface of each non-planar decorative portion are connected with each other;
   a protection structure disposed on the bottom surface of the transparent portion, wherein the protection structure includes a first transparent adhesive layer disposed on the bottom surface of the transparent portion and a transparent protective layer disposed on the first transparent adhesive layer; and
   an adhesion structure disposed on the two bottom surfaces of the two non-planar decorative portions, wherein the adhesion structure includes two first adhesive layers respectively disposed on the two bottom surfaces of the two non-planar decorative portions, two base layers respectively disposed on the two first adhesive layers, and two second adhesive layers respectively disposed on the two base layers;
   wherein the thickness of the protection structure is smaller than or substantially equal to the thickness of the adhesion structure, so that the height of the protection structure from the bottommost side of the protection structure to the bottom surface of the transparent portion is smaller than or substantially equal to the height of the adhesion structure from the bottommost side of the adhesion structure to the bottom surface of the non-planar decorative portion.

2. The glass protector of claim 1, wherein the second adhesive layer is connected between the base layer and a decoration area of the portable electronic device, a gap is formed between the transparent protective layer and a display area of the portable electronic device for separating the transparent protective layer and the display area of the portable electronic device from each other, and the difference in thickness between the protection structure and the adhesion structure is substantially between 0 and 0.15 mm.

3. The glass protector of claim 1, wherein the protection structure includes a second transparent adhesive layer disposed on the transparent protective layer, the second adhesive layer is connected between the base layer and a decoration area of the portable electronic device, the second transparent adhesive layer is connected between the transparent protective layer and a display area of the portable electronic device, and the difference in thickness between the protection structure and the adhesion structure is substantially between 0 mm and 0.15 mm, wherein the protection structure and the adhesion structure are separated from each other to form an air-discharging passage between the protection structure and the adhesion structure, the non-planar decorative portion has a positioning through hole corresponding to an alignment mark of the portable electronic device, and the adhesion structure has a passing opening for exposing a predetermined pattern on the bottom surface of the non-planar decorative portion.

4. The glass protector of claim 1, wherein the protection structure includes a second transparent adhesive layer disposed on the transparent protective layer and a first release film disposed on the second transparent adhesive layer, and the first release film has a first manual peeling portion separated from the second transparent adhesive layer, wherein the adhesion structure includes two second release films respectively disposed on the two second adhesive layers, and each second release film has a second manual peeling portion separated from the corresponding second adhesive layer.

5. The glass protector of claim 4, wherein the substrate structure is a non-planar tempered glass having a transparent bottom area and a nontransparent bottom area, wherein the transparent protective layer is an anti-watermark transparent film that has a thickness smaller than or substantially equal to 150 μm, a transmittance substantially between 88% and 99%, and a haze substantially between 0.1% and 2%, the first transparent adhesive layer is a high transmittance adhesive agent that has a adhesive force substantially between 8 N/25mm and 50 N/25mm and is made of one of an acrylate material, an epoxy resin material, and a silicon resin material, and the second transparent adhesive layer is a high transmittance adhesive agent that has a adhesive force substantially between 10 N/25mm and 200 N/25mm and is made of a silicon resin material, wherein the base layer is a base substrate made of one of poly ethylene terephthalate (PET), polymethylmethacrylate (PMMA), and polycarbonate (PC), the first adhesive layer is a water-proof explosion-proof adhesive agent made of one of an acrylate material, an epoxy resin material, and a silicon resin material, and the second adhesive layer is a water-proof explosion-proof adhesive agent made of one of an acrylate material, an epoxy resin material, and a silicon resin material.

6. A glass protector applied to a portable electronic device, comprising:
   a substrate structure having a transparent portion and a non-planar decorative portion extended from three sides of the transparent portion, wherein a bottom surface of the transparent portion and a bottom surface of the non-planar decorative portion are connected with each other;
   a protection structure disposed on the bottom surface of the transparent portion, wherein the protection structure includes a first transparent adhesive layer disposed on the bottom surface of the transparent portion and a transparent protective layer disposed on the first transparent adhesive layer; and an adhesion structure disposed on the bottom surface of the non-planar decorative portion, wherein the adhesion structure includes a first adhesive layer disposed on the bottom surface of the non-planar decorative portion, a base layer disposed on the first adhesive layer, and a second adhesive layer disposed on the base layer;

wherein the thickness of the protection structure is smaller than or substantially equal to the thickness of the adhesion structure, so that the height of the protection structure from the bottommost side of the protection structure to the bottom surface of the transparent portion is smaller than or substantially equal to the height of the adhesion structure from the bottommost side of the adhesion structure to the bottom surface of the non-planar decorative portion.

7. The glass protector of claim 6, wherein the second adhesive layer is connected between the base layer and a decoration area of the portable electronic device, a gap is formed between the transparent protective layer and a display area of the portable electronic device for separating the transparent protective layer and the display area of the portable electronic device from each other, and the difference in thickness between the protection structure and the adhesion structure is substantially between 0 and 0.15 mm.

8. The glass protector of claim 6, wherein the protection structure includes a second transparent adhesive layer disposed on the transparent protective layer, the second adhesive layer is connected between the base layer and a decoration area of the portable electronic device, the second transparent adhesive layer is connected between the transparent protective layer and a display area of the portable electronic device, and the difference in thickness between the protection structure and the adhesion structure is substantially between 0 mm and 0.15 mm, wherein the protection structure and the adhesion structure are separated from each other to form an air-discharging passage between the protection structure and the adhesion structure, the non-planar decorative portion has a positioning through hole corresponding to an alignment mark of the portable electronic device, and the adhesion structure has a passing opening for exposing a predetermined pattern on the bottom surface of the non-planar decorative portion.

9. The glass protector of claim 6, wherein the protection structure includes a second transparent adhesive layer disposed on the transparent protective layer and a first release film disposed on the second transparent adhesive layer, and the first release film has a first manual peeling portion separated from the second transparent adhesive layer, wherein the adhesion structure includes a second release film disposed on the second adhesive layer, and the second release film has a second manual peeling portion separated from the second adhesive layer.

10. A glass protector applied to a portable electronic device, comprising:

a substrate structure having a transparent portion and a non-planar decorative portion extended from and around an outer perimeter surface of the transparent portion, wherein a bottom surface of the transparent portion and a bottom surface of the non-planar decorative portion are connected with each other;

a protection structure disposed on the bottom surface of the transparent portion, wherein the protection structure includes a first transparent adhesive layer disposed on the bottom surface of the transparent portion and a transparent protective layer disposed on the first transparent adhesive layer; and an adhesion structure disposed on the bottom surface of the non-planar decorative portion, wherein the adhesion structure includes a first adhesive layer disposed on the bottom surface of the non-planar decorative portion, a base layer disposed on the first adhesive layer, and a second adhesive layer disposed on the base layer;

wherein the thickness of the protection structure is smaller than or substantially equal to the thickness of the adhesion structure, so that the height of the protection structure from the bottommost side of the protection structure to the bottom surface of the transparent portion is smaller than or substantially equal to the height of the adhesion structure from the bottommost side of the adhesion structure to the bottom surface of the non-planar decorative portion.

* * * * *